United States Patent
Lamm

[11] 3,719,174
[45] March 6, 1973

[54] ROTARY PISTON INTERNAL COMBUSTION ENGINE, ESPECIALLY OF TROCHOIDAL CONSTRUCTION

[75] Inventor: Heinz Lamm, Esslingen-St. Bernhardt, Germany

[73] Assignee: Daimler-Benz Aktiengesellschaft, Stuttgart-Unterturkheim, Germany

[22] Filed: Feb. 13, 1970

[21] Appl. No.: 11,154

[30] Foreign Application Priority Data

Feb. 15, 1969 Germany.....................P 19 07 747.5

[52] U.S. Cl..............................123/8.09, 123/8.45
[51] Int. Cl..............................F02b 53/12
[58] Field of Search..........123/8.09, 8.17, 8.13, 8.45, 123/8.05

[56] References Cited

UNITED STATES PATENTS

| | | | |
|---|---|---|---|
| 1,850,833 | 3/1932 | Erny | 123/8.19 |
| 2,020,089 | 11/1935 | Weed | 123/8.13 |
| 3,229,674 | 1/1966 | Muller | 123/8.09 |
| 3,245,388 | 4/1966 | Froede | 123/8.09 |
| 3,452,725 | 7/1969 | Kelly | 123/8.05 |

*Primary Examiner*—Clarence R. Gordon
*Attorney*—Craig, Antonelli and Hill

[57] ABSTRACT

A rotary piston internal combustion engine, especially of trochoidal construction, in which a spark plug, mounted in the engine casing, projects with its electrodes into a plug chamber which in turn, is in communication with the combustion chamber, whereby the communication is formed by two firing channels that terminate in the combustion chamber offset in the direction of the longitudinal axis of the engine.

19 Claims, 6 Drawing Figures

PATENTED MAR 6 1973 3,719,174
FIG. 1
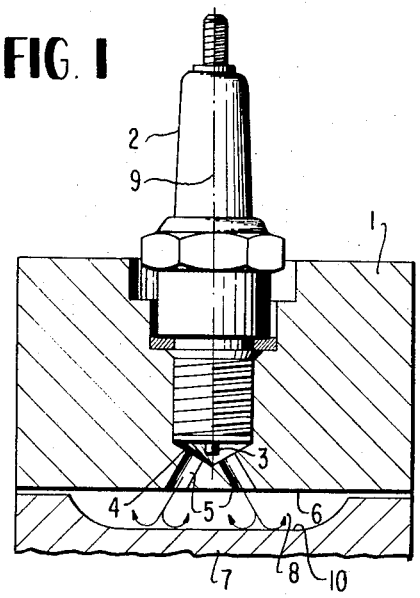
FIG. 2
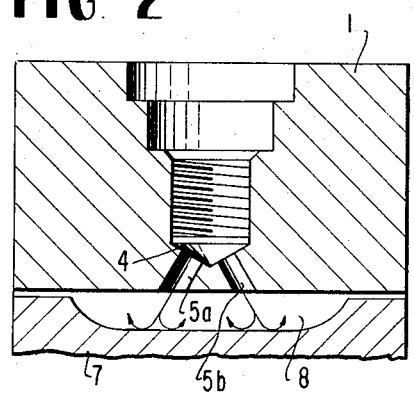
FIG. 4 FIG. 3
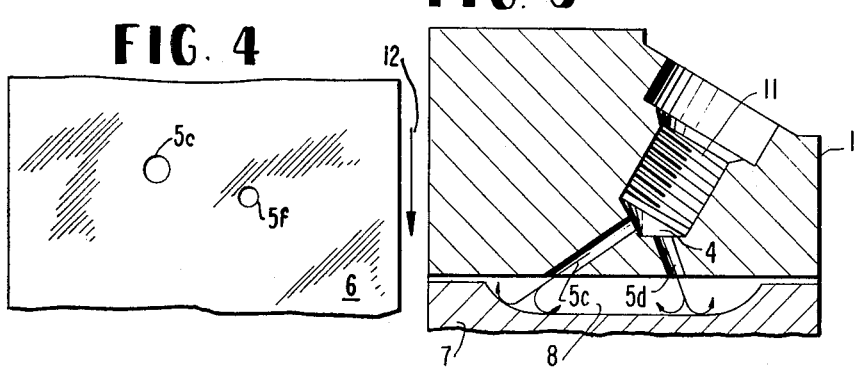
FIG. 6 FIG. 5
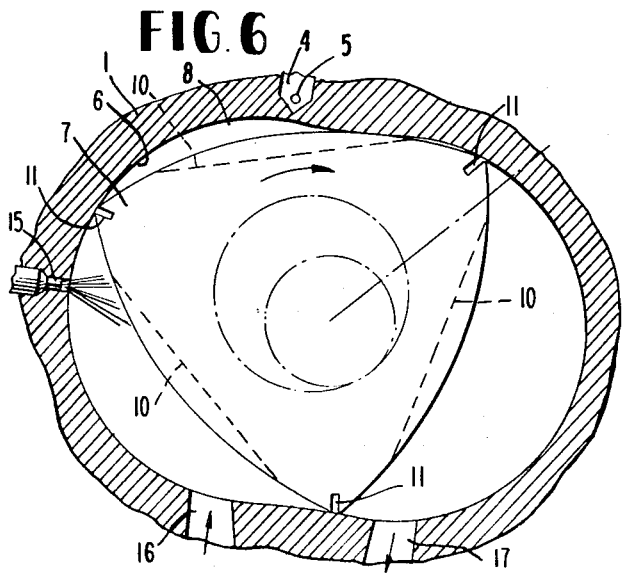 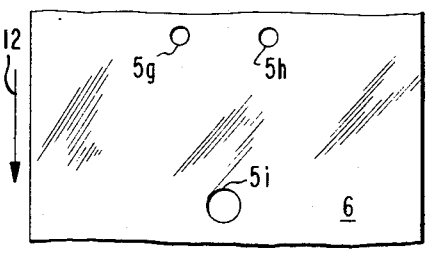
INVENTOR
HEINZ LAMM
BY Craig, Antonelli,
Stewart & Hill
ATTORNEYS

ROTARY PISTON INTERNAL COMBUSTION ENGINE, ESPECIALLY OF TROCHOIDAL CONSTRUCTION

The present invention relates to a rotary piston internal combustion engine, especially of trochoidal construction, with a spark plug arranged in a casing, which extends with its electrodes into a spark plug chamber, and with a connection between the spark plug chamber and the combustion chamber.

It is already known in the prior art to provide for such a connection a firing channel which is arranged in the center of the casing. Several disadvantages are connected therewith.

In order to achieve a relatively good scavenging of the spark plug chamber with fresh gases, the diameter of the firing channel, which is normally constructed as bore, must not be less than a predetermined amount which is normally larger than the thickness of the sealing strip or bar in the piston corners. Considerable overblow losses result therefrom during the sweeping over of the firing channel by the sealing bars. Furthermore, with a centrally arranged firing channel the piston top is heated up by the combustion gases leaving the firing channel essentially only in the center, whereas the sides remain relatively cool. This has as a consequence a non-uniform mixture preparation and therewith a poor combustion. Also, the casing is heated considerably more strongly in proximity to the firing channel than at the sides so that the casing contact surface of the piston becomes warped. As a result thereof, also the sealing bars in the piston corners are heated non-uniformly and bend through. As a result thereof, gases may blow through between the sealing bars and the contact surface of the casing so that not only pressure losses occur but also the lubricating film on the contact surface of the casing is destroyed. The wear at the sealing bars and the casing contact surface increases therewith.

The present invention is concerned with the task to eliminate the aforementioned shortcomings. The underlying problems are solved in accordance with the present invention in that the connection between the spark plug chamber and the combustion chamber consists of two firing or flame channels which terminate in the combustion chamber mutually offset in the direction of the longitudinal axis of the rotary piston internal combustion engine.

As a result of the arrangement in accordance with the present invention of the firing channels, a uniform heating of the casing, of the piston top and of the sealing bars is achieved and therewith a warping of these parts with the harmful consequences is avoided. Additionally, the diameter of each firing channel can be kept smaller than the thickness of a sealing bar without reducing the flow cross-section. Furthermore, the mixture present in the combustion chamber is ignited at two places which has as a consequence an improved combustion.

Accordingly, it is an object of the present invention to provide a rotary piston internal combustion engine of the type described above which eliminates the aforementioned shortcomings and drawbacks by extremely simple means.

A further object of the present invention resides in a rotary piston internal combustion engine, especially of trochoidal construction, in which a relatively good scavenging of the spark plug chamber with fresh gases is achieved without the danger of non-uniform heating, warping of certain parts and premature wear of these engine parts.

A still further object of the present invention resides in a rotary piston internal combustion engine which avoids pressure losses and eliminates impairment of the lubricating film on the contact surface of the casing.

These and further objects, features and advantages of the present invention will become more obvious from the following description when taken in connection with the accompanying drawing which shows, for purposes of illustration only, several embodiments according to the present invention, and wherein:

FIG. 1 is a partial longitudinal cross-sectional view through a rotary piston internal combustion engine with two firing or flame channels between the spark plug chamber and the combustion chamber;

FIG. 2 is a partial longitudinal cross-sectional view through a rotary piston internal combustion engine similar to FIG. 1 with two firing or flame channels having differing diameters;

FIG. 3 is a partial cross-sectional view through a rotary piston internal combustion engine similar to FIG. 1 with two firing or flame channels having differing lengths;

FIG. 4 is a partial plan-view on the contact surface of the casing of the rotary piston internal combustion engine with two firing or flame channels having differing diameters which are mutually offset in the direction of rotation of the piston, FIG. 5 is a partial plan-view, similar to FIG. 4, with firing or flame channels starting from two spark plugs, and FIG. 6 is a schematic cross-sectional view illustrating a trochoidal rotary piston internal combustion engine to which the present invention applies.

Referring now to the drawings wherein like reference numerals are used throughout the various views to designate like parts, and more particularly to FIG. 1, reference numeral 1 designates in this figure a casing having a spark plug 2 arranged therein which projects with its electrodes 3 into a spark plug chamber 4. The spark plug chamber 4 is constructed essentially of conical shape. Two firing or flame channels 5 with identical diameters start perpendicularly from the cone surface of the plug chamber 4 and are constructed as bores in the casing 1. The two firing channels 5 terminate in the combustion chamber 8 at an inclined angle to the casing contact surface 6 of the piston 7 whereby the orifices have the same distances from the plane of symmetry 9 of the casing 1. The piston 7 is illustrated at the moment of ignition so that the piston recess 10 is disposed below the firing channels 5. The mixture reaching the spark plug chamber 4 during the compression by way of the two firing channels 5 is subjected in the chamber 4 to a relatively strong turbulence or vortexing so that a more ignitable mixture is presented to the electrodes 3 of the spark plug 2 than is in the presence of only a single firing channel. After the ignition, the hot gases impinge out of the spark plug chamber 4 at two places under an oblique angle against the piston recess or trough 10 whereby an increased turbulence is produced in the combustion chamber 8 and as a result of the wider flame front, a more rapid combustion of the mixture is achieved.

In FIG. 2, in which, as in FIG. 3, the spark plug is not illustrated, the two firing channels 5a and 5b have the same position as in FIG. 1 but have differing cross-sectional areas. As a result thereof, the gases in the two firing channels 5a and 5b receive differently large velocities both during the inflow into the spark plug chamber 4 as also during the outflow in the combustion chamber 8 so that the turbulence increases in the plug chamber 4 and in the combustion chamber 8.

In FIG. 3 the two firing channels 5c and 5d have different lengths which is achieved in this embodiment by an inclined position of the spark plug bore 11 and therewith of the plug chamber 4. Different gas velocities in the two firing channels 5c and 5d result therefrom similar as in the embodiment according to FIG. 2. It is also possible that the firing channel 5d has a larger diameter than the firing channel 5c so that the mentioned effect takes place to an increased extent. Furthermore, the orifices of the firing channels 5c and 5d may be disposed further apart with this arrangement. The firing channels 5c and 5d impinge against the piston top under different angles and are therefore deflected more or less tangentially by the same.

FIG. 4 illustrates the plan view of the casing contact surface 6 with the orifices of two firing channels 5e and 5f which, in addition to being offset in the direction of the longitudinal axis of the engine, are arranged mutually offset slightly in the direction of rotation of the piston, indicated by the arrow 12. This offset improves the scavenging of the plug chamber since the orifices of the two firing channels 5e and 5f are disposed for a short period of time on different sides of the sealing bar. The firing channel 5e traversed first by the sealing bar, has a larger diameter than the second firing channel 5f so that the entrance of fresh gases can take place more readily. The offset of the two firing channels 5e and 5f in the circumferential direction 12 is approximately equal to the diameter of the larger firing channel 5e or approximately equal to the sealing bar thickness.

In FIG. 5 the orifices of three firing channels 5g, 5h and 5i are illustrated which start from two spark plugs arranged one behind the other in the direction of rotation 12. Two firing channels 5g and 5h with identical diameters are coordinated to the first spark plug in the direction of rotation 12 whereas only one firing channel 5i with larger diameter is coordinated to the second spark plug. Even though this diameter is larger than the thickness of the sealing bar, overblow losses can hardly occur in this embodiment since during the passing or sweeping of the firing channel 5i by the sealing bar, approximately the same pressures prevail in the compression chamber and in the combustion chamber. However, it is also possible, in principle, to coordinate two firing channels to the second spark plug.

FIG. 6 illustrates a rotary piston internal combustion engine of trochoidal construction, as known in the art, to which the present invention applies. The piston 7 of polygonal shape is provided with sealing bars 11 in the corner thereof which slide along the running surface 6 of the casing 1. The spark plug chamber 4, shown without spark plug, is again provided with firing channels terminating in the running surface 6 offset in the direction of the longitudinal axis of the engine which is perpendicular to the plane of the drawing. One of these firing channels 5 is shown in the drawing. Additionally, an injection nozzle 15 injects the fuel in a conventional manner, whereby the inlet of the air takes place by way of inlet channel 16 and the discharge of the combusted exhaust gases by way of channel 17.

While I have shown and described several embodiments in accordance with the present invention, it is understood that the same is not limited thereto but is susceptible of numerous changes and modifications as known to those skilled in the art and I therefore, do not wish to be limited to the details shown and described herein but intend to cover all such changes and modifications as are encompassed by the scope of the appended claims.

What is claimed is:

1. A rotary piston internal combustion engine with a casing in which is arranged a spark plug projecting with its electrodes into a spark plug chamber, and with a communication between the plug chamber and a combustion chamber, characterized in that the communication from said spark plug chamber includes at least two channel means which terminate in the combustion chamber mutually displaced in the direction of the longitudinal axis of the rotary piston internal combustion engine.

2. A rotary piston internal combustion engine with an internal running surface in the casing according to claim 1, characterized in that the engine is of trochoidal construction and includes a polygonal piston provided at its piston corners with sealing bar means which extend in the piston corners substantially in a direction parallel to said longitudinal axis and sweep along the internal running surface containing the discharge apertures of said channel means.

3. A rotary piston internal combustion engine according to claim 2, characterized in that the channel means have differently large cross-sectional areas.

4. A rotary piston according to claim 3, characterized in that the channel means have different lengths.

5. A rotary piston internal combustion engine according to claim 4, characterized in that the channel means are mutually offset in the direction of rotation of the piston.

6. A rotary piston internal combustion engine according to claim 5, characterized in that the offset amounts to about the diameter of a channel means.

7. A rotary piston internal combustion engine according to claim 5, characterized in that the offset is approximately equal to the thickness of a sealing bar.

8. A rotary piston internal combustion engine with two spark plugs in a casing according to claim 5, characterized in that two channel means are coordinated only to the first spark plug in the direction of the rotation of the piston.

9. A rotary piston internal combustion engine with two spark plugs in the casing according to claim 5, characterized in that two channel means are coordinated to each spark plug.

10. A rotary piston internal combustion engine with a casing in which is arranged a spark plug projecting with its electrodes into a spark plug chamber, and with a communication between the plug chamber and a combustion chamber formed between the inner surface of the casing and a polygonal piston provided with sealing bar means in its piston corners and in contact with said inner surface, characterized in that the communication from said spark plug chamber includes at least two channel means which terminate in the combustion chamber mutually displaced in the direction of the longitudinal axis of the rotary piston internal combustion engine.

11. A rotary piston internal combustion engine according to claim 10, characterized in that the channel means have differently large cross-sectional areas.

12. A rotary piston internal combustion engine according to claim 10, characterized in that only two channel means are coordinated to each spark plug.

13. A rotary piston according to claim 10, characterized in that the channel means have different lengths.

14. A rotary piston internal combustion engine according to claim 11, characterized in that the channel means are mutually offset in the direction of rotation of the piston.

15. A rotary piston internal combustion engine with two spark plugs in a casing according to claim 10, characterized in that two channel means are coordinated only to the first spark plug in the direction of the rotation of the piston.

16. A rotary piston internal combustion engine with two spark plugs in a casing according to claim 10, characterized in that two channel means are coordinated to each spark plug.

17. A rotary piston internal combustion engine according to claim 10, characterized in that the channel means are mutually offset in the direction of rotation of the piston.

18. A rotary piston internal combustion engine according to claim 17, characterized in that the offset amounts to about the diameter of a channel means.

19. A rotary piston internal combustion engine according to claim 17, characterized in that the offset is approximately equal to the thickness of a sealing bar.

* * * * *